(12) United States Patent
Mount (10) Patent No.: US 8,424,778 B2
(45) Date of Patent: Apr. 23, 2013

(54) SLOW RELEASE DEER AND RODENT OUTDOOR DETERENT DEVICE

(76) Inventor: Bradley G. Mount, Stockton, NJ (US)

( * ) Notice: Subject to any disclaimer, the term of this patent is extended or adjusted under 35 U.S.C. 154(b) by 761 days.

(21) Appl. No.: 12/586,955

(22) Filed: Sep. 30, 2009

(65) Prior Publication Data

US 2011/0073671 A1    Mar. 31, 2011

(51) Int. Cl.
*A24F 25/00* (2006.01)
*A61L 9/04* (2006.01)

(52) U.S. Cl.
USPC ............... 239/44; 239/54; 239/145; 239/326; 43/1; 222/187

(58) Field of Classification Search ............ 239/44, 239/45, 48, 52, 145, 326, 54; 43/1, 129; 222/187
See application file for complete search history.

(56) References Cited

U.S. PATENT DOCUMENTS

| | | | |
|---|---|---|---|
| 2,769,668 A * | 11/1956 | Richards | ........................ 239/145 |
| 4,552,307 A | 11/1985 | Stedham | |
| RE32,513 E | 10/1987 | Seaber et al. | |
| 5,048,218 A * | 9/1991 | Stewart | ................................ 43/1 |
| 5,083,708 A | 1/1992 | Walters | |
| 5,220,741 A | 6/1993 | Burgeson | |
| 5,307,584 A * | 5/1994 | Jarvis | .................................. 43/1 |
| 5,379,545 A | 1/1995 | Gall et al. | |
| 5,555,663 A * | 9/1996 | Burgeson | ............................ 43/1 |
| 5,823,432 A * | 10/1998 | Hogan | ............................ 239/36 |
| 6,158,668 A | 12/2000 | Burgeson | |
| 6,192,621 B1 | 2/2001 | Fain | |
| 6,648,239 B1 | 11/2003 | Myny et al. | |
| 6,745,950 B1 | 6/2004 | Longo | |
| 7,325,358 B1 | 2/2008 | Chalupsky et al. | |
| 7,419,102 B2 | 9/2008 | Harris, Jr. | |

* cited by examiner

*Primary Examiner* — Dinh Q Nguyen
(74) *Attorney, Agent, or Firm* — Kenneth P. Glynn, Esq.

(57) ABSTRACT

A slow release deer and rodent outdoor deterrent device includes: a) a waterproof hollow housing having a top and a bottom, a top wick orifice and a bottom wick; b) a wick externally extending from outside the hollow housing top, through the top wick orifice and into the hollow housing, through the bottom wick orifice and externally below the hollow housing bottom; c) a teabag containing dried repellant that is activated by water contact. The teabag acts as a two way filter to permit water to enter the teabag and permit a water-dissolved repellant brew to exit the teabag, the teabag being inside the housing in contact with the wick. The device is placed outdoors proximate vegetation to be protected and releases repellent when wetted by rain or watering.

10 Claims, 7 Drawing Sheets

SLOW RELEASE DEER AND RODENT OUTDOOR DETERENT DEVICE

BACKGROUND OF INVENTION a. Field of Invention

The invention relates generally to a slow release deer and rodent outdoor deterrent device. This device uses a closed hollow housing in which to store dried deer/rodent/pest repellant. The housing has an incoming and outgoing wick (one or plural wicks may be used) and is water-activated to slowly release a water/repellant brew that dissipates a deterrent odor.

b. Description of Related Art

The following patents are representative of the field pertaining to the present invention:

U.S. Pat. No. 7,419,102 to Rano J. Harris, Jr. describes a dispenser for scents and aromas. The scent dispenser includes a hollow central body that contains a rotating shaft. A wick is wound around the shaft and extends through an opening in the top of the central body. A sealable cap is included to allow scent material to be added to the wick inside the central body. Finally, a suspension mechanism in included to allow the dispenser to be suspended from a separate structure.

U.S. Pat. No. 7,325,358 to Clayton Wayne Chalupsky et al. describes a device for displaying an odorous animal repellent. The device comprises a housing having a chamber adapted for receiving the animal repellent. The device further comprises a retainer on the underside of the housing which allows permeation of the scent of the animal repellent from the chamber into the air surrounding the chamber, but does not allow the animal repellent to sift through the retainer.

U.S. Pat. No. 6,745,950 to Phillip J. Longo describes a scent emitting system comprised of a shaft in a tubular configuration. The shaft has upper and lower ends. Both ends have female threads. An upper subassembly is provided. The subassembly has a disc-shaped central component and a downwardly projecting cap. The cap has an upper region. The upper region is formed with male threads threadedly couplable with the female threads at the upper end of the shaft. A wick is provided. The wick is slidably positionable within the shaft and has a central core. The central core has outwardly projecting bristles. The wick has an upper end coupled to the cap. Further provided is a closure assembly. The closure assembly has an upper extent. The upper extent is in a cylindrical configuration and has male threads. The male threads are threadedly couplable with the female threads at the lower end of the shaft.

U.S. Pat. No. 6,648,239 to Michael A. Myny et al. describes a device for dispensing animal scents, for the attracting of animals such as deer comprising a cylindrical outer housing, an inner assembly, slidably received within the housing and an absorbent wick disposed within the inner assembly for saturation with a liquid attractant such as deer urine. The inner assembly comprises a hollow cylinder with a wick disposed there through, and has a plurality of holes allowing the scent given off from the liquid attractant to diffuse into the air. The device can be selectively closed when so desired to prevent unnecessary dissipation of the attractant, and further prevent unnecessary evaporation.

U.S. Pat. No. 6,192,621 to Gerald Sterling Fain describes a pest control device for deterring or attracting creatures which feed on vegetables, fruits and flowers grown by farmers and gardeners. The device includes a base portion within which an odorous substance is disposed. The odorous substance is selected to either deter or attract pests and insects. A cap portion is removably securable to the base portion and covers the base portion to prevent the gravitational accumulation of rainwater therein. An unsealed region between the base portion and the cap portion allows odors from the odorous substance within the base portion to flow into the ambient environment.

U.S. Pat. No. 6,158,668 to John R. Burgeson describes a reusable hanging container and scent wick for attracting big game which has a closed end with a hanger for supporting the container above the ground. An opening into the container is located on the bottom of the container with a cap to sealably close the container. A scent wick for receiving and disbursing a big game scent is sized to fit within the container to permit the sealing of the container with a cap. The scent wick is shaped to permit a substantial portion of the wick to fall out of the container to expose the scent wick while the container above protects the wick from falling moisture.

U.S. Pat. No. 5,379,545 to Bela Gall et al. describes a device for diffusing chemical animal repellent, comprising a container having a ground engaging pin, a sloping cover, and orifices permitting diffusion of chemical animal repellent in the container to the outside atmosphere.

U.S. Pat. No. 5,220,741 to John R. Burgeson describes a device for use by hunters for the depositing of animal scent for the purpose of attracting game. The invention includes a rigid scent container releasably and sealably engagable with a temperature buffering scent reservoir. The present invention is suspendable above the ground whereby the scent reservoir depends below the scent container. The scent reservoir includes an attachment portion providing for the releasable and sealable engagement with the container, and a reservoir portion. The reservoir portion has an exterior surface defining an interior volume thereof. The scent reservoir also includes a conduit having a first end adjacent the attachment portion and secured thereto, and a second end terminating within the interior volume of the reservoir portion. The conduit provides for fluid communication of the liquid scent between the interior of the container and the scent reservoir portion. A scent releasing orifice extends through the surface of the reservoir portion above the second end of the conduit.

U.S. Pat. No. 5,083,708 to Gerald A. Walters describes a wildlife repellant unit which is constructed of a substantially cylindrical tube having a cavity therein into which chemical repellant is placed, further having a barrier positioned inside the cavity to restrain the chemical wildlife repellant from deteriorating until activation, and further including a pair of openings positioned above the barrier to facilitate movement of air, thereby distributing the repulsive odors of the chemical repellant once the unit is activated. The body of the wildlife repellant unit may be constructed of a strong yet pliable material such as rubber or plastic so that, when it is pressed between the thumb and the forefinger, the barrier can be broken and the wildlife repellent unit activated. A clip is also provided to facilitate attachment of the wildlife repellant unit to a limb of a tree, thereby facilitating use of the wildlife repellant unit U.S. Pat. No. 4,552,307 to Yolanda Stedham describes a pet repellent device for use outdoors consisting of a refillable vented container is disclosed. The container, which is secured to the ground around shrubs and grass areas, is vented to allow the vapors from the liquid repellent in the container to flow into the air in the area that is desired to keep free of pets. The pets smell the repelling vapors, which are harmless, and completely avoid the area.

U.S. Pat. No. RE32,513 to Geoffrey B. Seaber et al. describes a hollow container comprising a shell which is at least partially porous, containing an entrapped volatile substance and a process for dispensing the volatile substance at a visibly detectable rate, continuously or discontinuously, for discrete periods of time at a steady state, the volatile composition being in the alternative, a perfume composition, a deodorant composition, an air freshener composition, an insecticide composition, a herbicide composition, an odor masking composition, a pheromone composition, an animal repellent composition, or an insect repellent composition. The said container containing the entrapped volatile substance ceases to operate, discretely, when said container is placed in an outer air-tight container. The structure consisting of the outer container and the inner container is also a part of the invention.

Notwithstanding the prior art, the present invention is neither taught nor rendered obvious thereby.

SUMMARY OF INVENTION

The present invention is directed to a slow release deer and rodent outdoor deterrent device. This present invention device includes: a) a waterproof hollow housing having a top and a bottom, and having a top wick orifice at the top and a bottom wick orifice at the bottom; b) a wick externally extending from outside the hollow housing top, through the top wick orifice and into the hollow housing, down through the hollow housing, through the bottom wick orifice and externally below the hollow housing bottom; c) a teabag containing dried repellant that is activated by water contact, the teabag acting as a two way filter to permit water to enter the teabag and permit a water-dissolved repellant brew to exit the teabag, the teabag being inside the hollow housing in physical contact with the wick. The present invention device is placed outdoors proximate vegetation (such as a sapling that could be ruined by buck antlers, or flower plants or beds that are fodder for deer and/or other pests or rodents) or other item to be protected (such as a koi pond, a water treatment, a sand box or anything needing protection from deer or animals). The present invention device is placed or hung outdoors with the hollow housing top facing upwardly and the wick extending upwardly from the top orifice. When water is applied to the wick by man or nature, water travels down the wick and enters the hollow housing on the wick, contacts the teabag, contacts the dried repellant and forms a water-dissolved repellant brew; the brew flows down the wick through the bottom wick orifice and dispenses repellant odor from the wick that extends below the bottom of the hollow housing.

In some embodiments of the present invention slow release deer and rodent outdoor deterrent device, the dried repellant is selected from the group consisting of natural predator-sourced repellant and man-made repellant.

In some embodiments of the present invention slow release deer and rodent outdoor deterrent device, the dried repellant is a dried predator urine. It may, instead, be soap or tallow.

In some embodiments of the present invention slow release deer and rodent outdoor deterrent device, the wick is selected from the group consisting of natural fiber wicks and man-made wicks.

In some embodiments of the present invention slow release deer and rodent outdoor deterrent device, the wick is natural and biodegradable and is selected from the group consisting of hemp, jute, cotton, linen and sisal.

In some embodiments of the present invention slow release deer and rodent outdoor deterrent device, the hollow housing has at least two parts that are joined together.

In some embodiments of the present invention slow release deer and rodent outdoor deterrent device, the hollow housing has a shape selected from the group consisting of spheroid, cuboid, ovoid, ellipsoid and fruit-shaped. By "cuboid" is meant any shape having six sides, the sides having the same or different dimensions. By "fruit shaped" is meant any shape like a fruit. A subset of the fruit-shape family is the "pearoid", i.e., having the shape of a pear.

In some embodiments of the present invention slow release deer and rodent outdoor deterrent device, all components thereof are biodegradable.

In some embodiments of the present invention slow release deer and rodent outdoor deterrent device, the hollow housing is biodegradable and is made from coconut coir and natural waterproof binder, such as latex or natural gums.

In some embodiments of the present invention slow release deer and rodent outdoor deterrent device, the natural waterproof binder is latex.

In some other embodiments of the present invention slow release deer and rodent outdoor deterrent device, there may be two, three or more wicks, connected to one another or functionally connected to one or more teabags. In an alternative preferred embodiment of the present invention slow release deer and rodent outdoor deterrent device, there is: a) a waterproof hollow housing having a top and a bottom, and having a top wick orifice at the top and a bottom wick orifice at the bottom; b) a pair of wicks, being a first wick externally extending from outside the hollow housing top, through the top wick orifice and into the hollow housing, and a second wick extending down through the hollow housing, through the bottom wick orifice and externally below the hollow housing bottom; and c) a teabag containing dried repellant that is activated by water contact, the teabag acting as a two way filter to permit water to enter the teabag and permit a water-dissolved repellant brew to exit the teabag, the teabag being inside the hollowing housing in physical contact with both of the pair of wicks.

It functions in the same manner as the earlier described single wick present invention device and may have any or all of the various features and alternatives described above.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Referring in detail to the drawings, like reference numerals designate corresponding parts throughout the several views; various embodiments of the present invention are shown.

Figure 1:
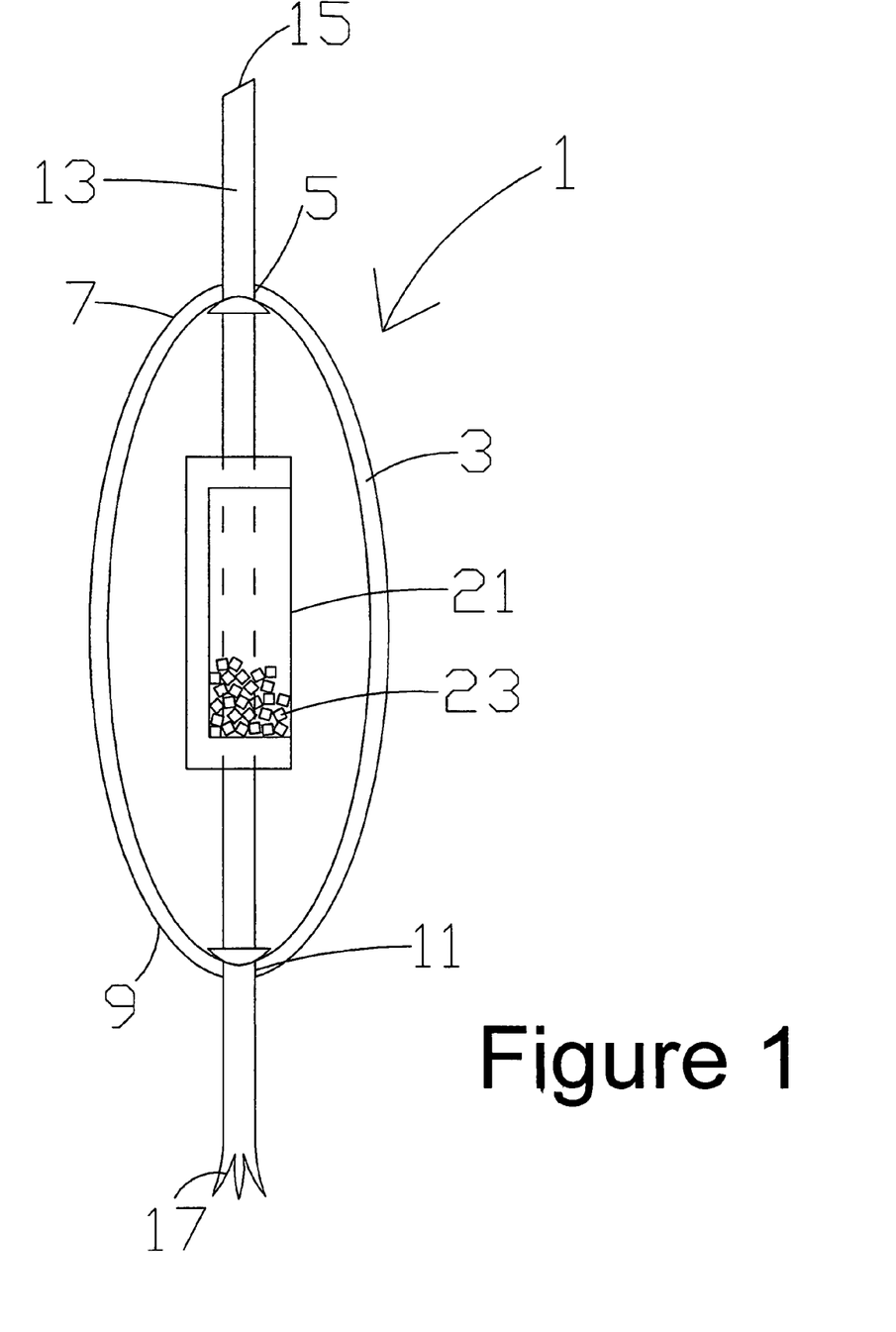
FIG. 1 is an open front view of an embodiment of a present invention slow release deer and rodent outdoor deterrent device utilizing a plastic two piece housing with a single wick.

FIG. 1 is an open front view of an embodiment of a present invention slow release deer and rodent outdoor deterrent device 1, utilizing two connecting sealed plastic housing sections (one is removed for this Figure). Although the housing must be hollow and waterproof and have at least one top and one bottom wick orifice, there may be more than one top and/or more than one bottom orifice, but one top and one bottom is preferred for most natural materials. Also, although shown to be at the topmost and bottommost locations, these orifices may be elsewhere on the tops and bottoms of the housing and still function as intended for the present invention devices. In this FIG. 1, there is a main hollow housing 3, made of any material that is waterproof. It may be clamshell, that is, in two halves, that snap, force fit, heat weld or glue or otherwise connect to seal. these may be hingedly connected or separate pieces. They may be halved vertically, as suggested by the Figure, or horizontally or otherwise. Horizontally is preferred when water entry prevention may be enhanced by the dome effect of a horizontally connected two piece housing. Housing 3 has a top wick orifice 5 at its top 7 and a bottom wick orifice 11 at its bottom 9. There is a single wick 15 that has a top (wetting) portion 13 and a bottom (brew odor dispersing) portion 17. Wick 15 passes through teabag 21, containing rodent repellent crystals 23. Except for water passing along the wick, teabag 21 and its contents are maintained in a dry state and protected from moisture. an optional desiccant, such as calcium chloride or natural rice, may also be included in this housing 3, or any other embodiment, to manage moisture content of the housing.

When water is applied to the wick by pouring (like watering a plant), hosing or nature (rain or melting snow or ice), water travels down the wick and enters the hollow housing 3 on the wick 15. the water then contacts the teabag 21, contacts the dried repellant crystals 23 and forms a water-dissolved repellant brew. The brew flows down the wick 15, through the bottom wick orifice 11 and dispenses repellant odor from the wick end 17 that extends below the bottom of the hollow housing 3.

Figure 2:
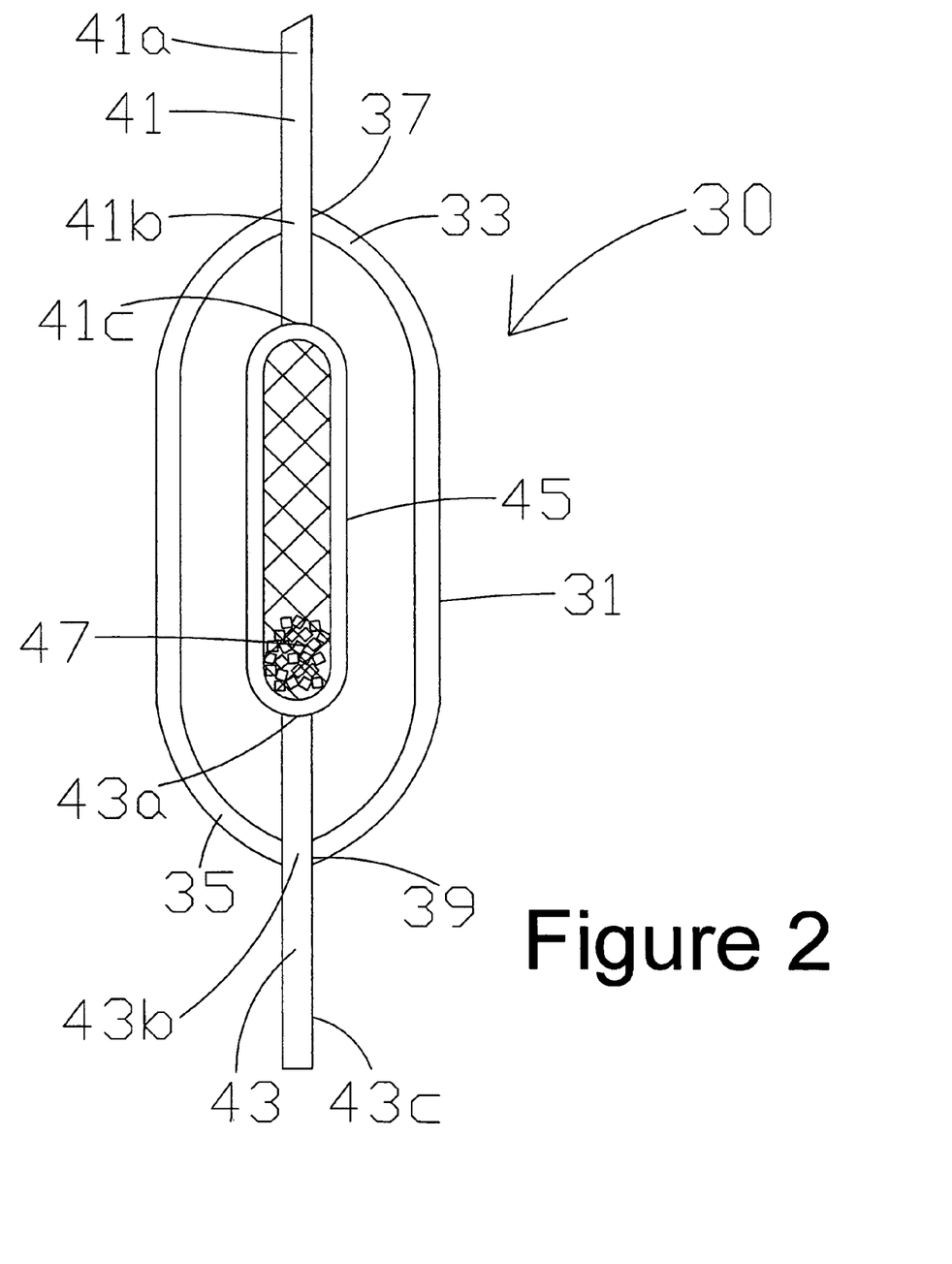
FIG. 2 is an open front view of an embodiment of the present invention slow release deer and rodent outdoor deterrent device utilizing two wicks.

FIG. 2 is an open front view of an embodiment of the present invention slow release deer and rodent outdoor deterrent device 30 utilizing two wicks 41 and 43. Hollow waterproof housing 31 has a top 33 and a bottom 35, with top and bottom wick orifices 37 and 39, respectively. A first wick 41, being a top wick, has an open air section 41a for receiving and wicking water downwardly, a midsection 41b, that passes through orifice 37 and an internal section 41c connected to teabag 45, with dried repellent 47 contained therein. Teabag 45 is connected to second wick 43 at second wick internal, top section 43a. Wick midsection 43b passes through orifice 39 and open air bottom section 43c will act as an odor dispensing section. When water is applied to the first wick 41, the water travels down the wick 41 and enters the hollow housing 31 and then contacts the teabag 45, contacts the dried repellant 47 and forms a water-dissolved repellant brew. The brew flows down the second wick 43, through the bottom wick orifice 39 and dispenses repellant odor from the wick end section 43c that extends below the bottom of the hollow housing 31.

Figure 3:
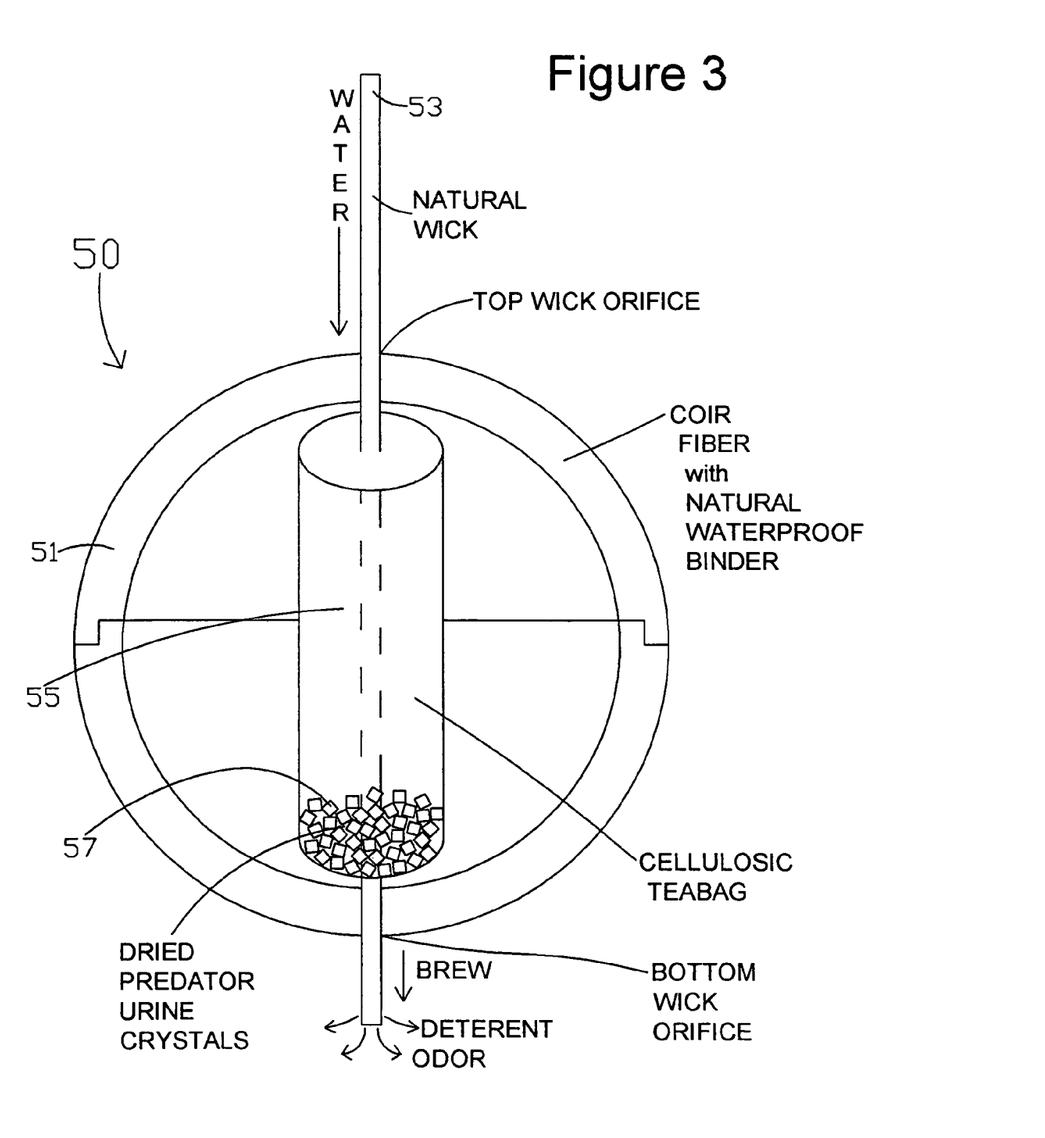
FIG. 3 is a cut front view of an embodiment of the present invention slow release deer and rodent outdoor deterrent device utilizing all biodegradable materials.

FIG. 3 is a cut front view of an embodiment of the present invention slow release deer and rodent outdoor deterrent device 50, utilizing all biodegradable materials. In this FIG. 3, there is a main hollow housing 51, made of natural biodegradable coconut coir and a natural waterproof binder, such as natural latex. Any natural biodegradable material that is waterproof may be used. It is, formed by mold in two halves, that force fit together and a glued with natural binder. a preferred configuration is with the upper section shrouding the lower section as shown in this Figure. Thus, water entry prevention is enhanced by the dome effect by horizontally connecting two piece housing. There is a natural biodegradable wick 53 that may be jute or other natural wick. This single wick 53 has a top (wetting) portion and a bottom (brew odor dispersing) portion and an internal central portion that passes through biodegradable cellulosic teabag 55, containing natural dried rodent repellent crystals, that is, dried predator urine crystals 57. Except for water passing along the wick 53, teabag 55 and its contents are maintained in a dry state and protected from moisture. An optional natural desiccant, rice, may also be included in this housing 51, to manage moisture content of the housing. Water passes down wick 53 through the top wick orifice, into teabag 55 to partially dissolve and thus brew with crystals 57 and the brew exits the bottom wick orifice via the lower end of wick 53 to disperse deterrent odor and cause the deer and/or other rodents to stay away from the vicinity of the device 50 and any item to which it may be protecting. Eventually, typically after one season, the device 50 will begin to biodegrade and will eventually completely return to the soil.

Figure 4:
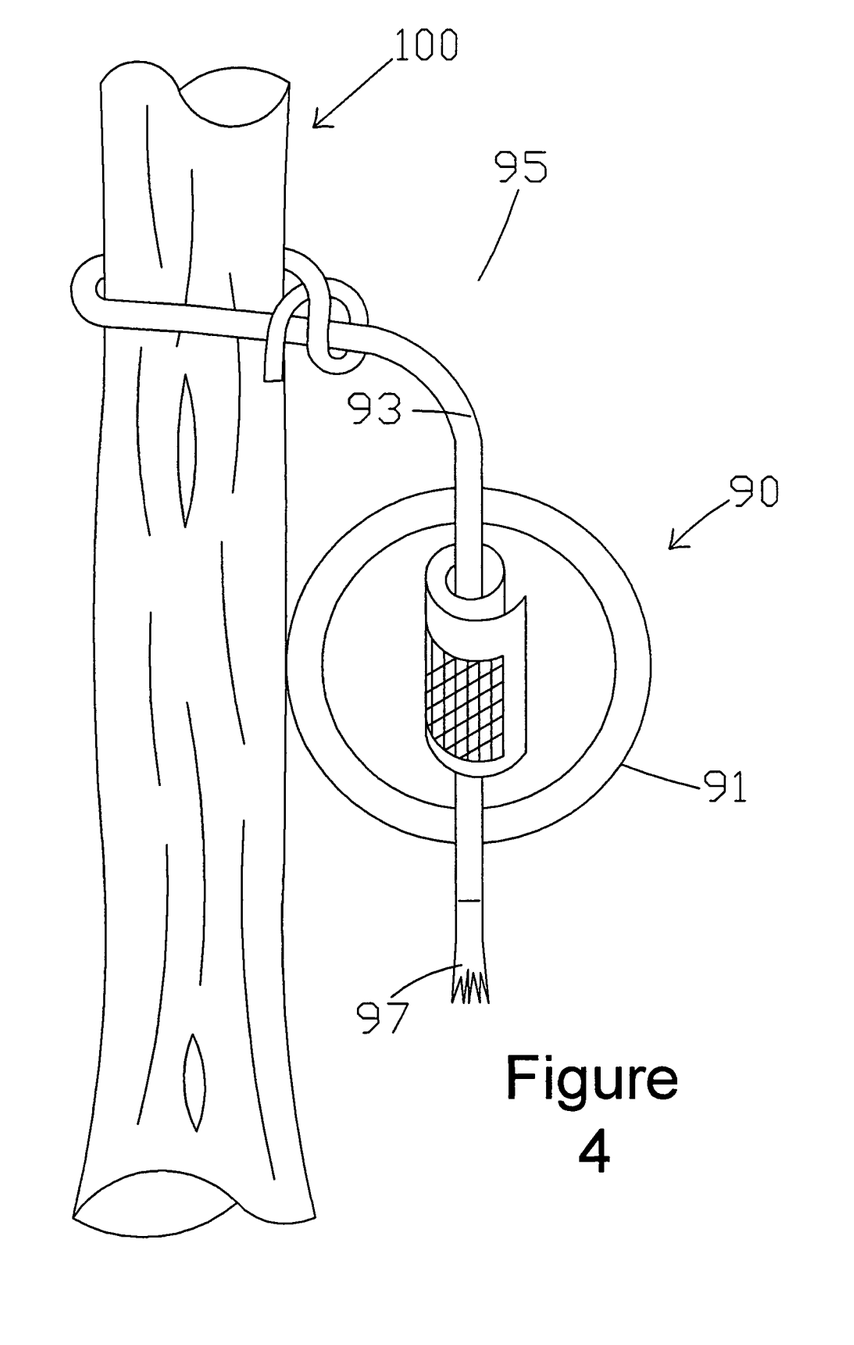
FIG. 4 is a cut front view of another embodiment of a present invention slow release deer and rodent outdoor deterrent device tied to the vertical trunk of a sapling.

FIG. 4 is a cut front view of another embodiment of a present invention slow release deer and rodent outdoor deterrent device 70 illustrating some of the salient features of this embodiment. There is a coir and binder shell upper half 71 connected to lower half 73, with top wick orifice 75 and bottom orifice 77, respectively, as shown. The top end 83 of wick 79 is tied around sapling 80, and it passes into the shell and through teabag and repellent 85 and out to end 81 where repellent odor is dissipated when wick 79 is wetted.

Figure 5:
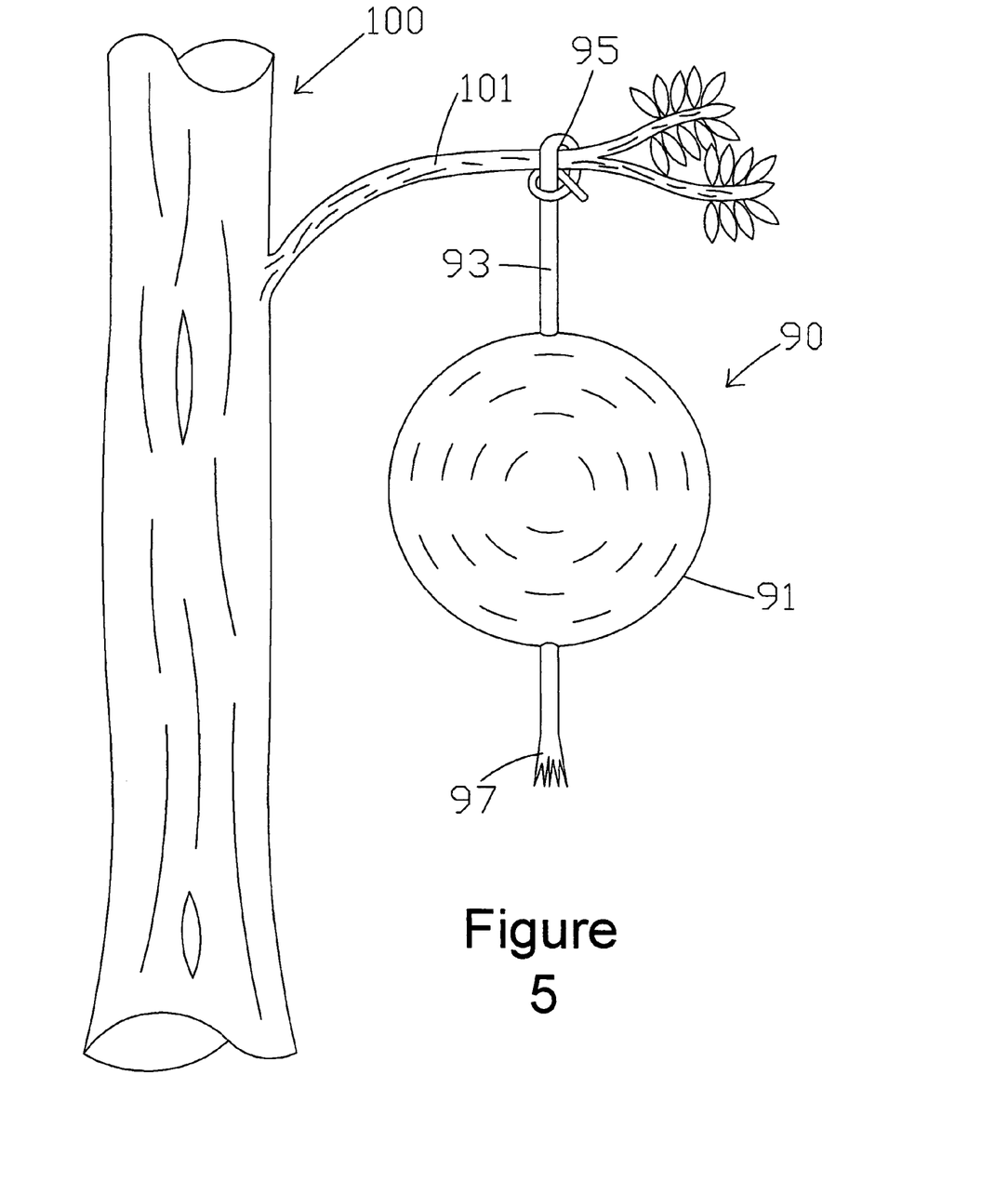
FIG. 5 is a front view of another embodiment of a present invention slow release deer and rodent outdoor deterrent device tied to and hung from a branch of a sapling.

FIG. 5 is a front view of another embodiment of a present invention slow release deer and rodent outdoor deterrent device 90 tied to and hung from a branch 101 of a sapling 100. Wick 93 extends out of housing 91 at the top and is tied by knot 95 to hang from branch 101. Thus, it serves both as a wick and as a hanger. Alternatively, separate hangers could be attached to the wick, e.g., a hook. Dispersing wick end 97 is frayed and extends out from and is located below the housing 91. This device works in the same fashion as previously discussed embodiments, and contains one or more teabags inside the housing 91 and in contact with the wick 93.

Figure 6:
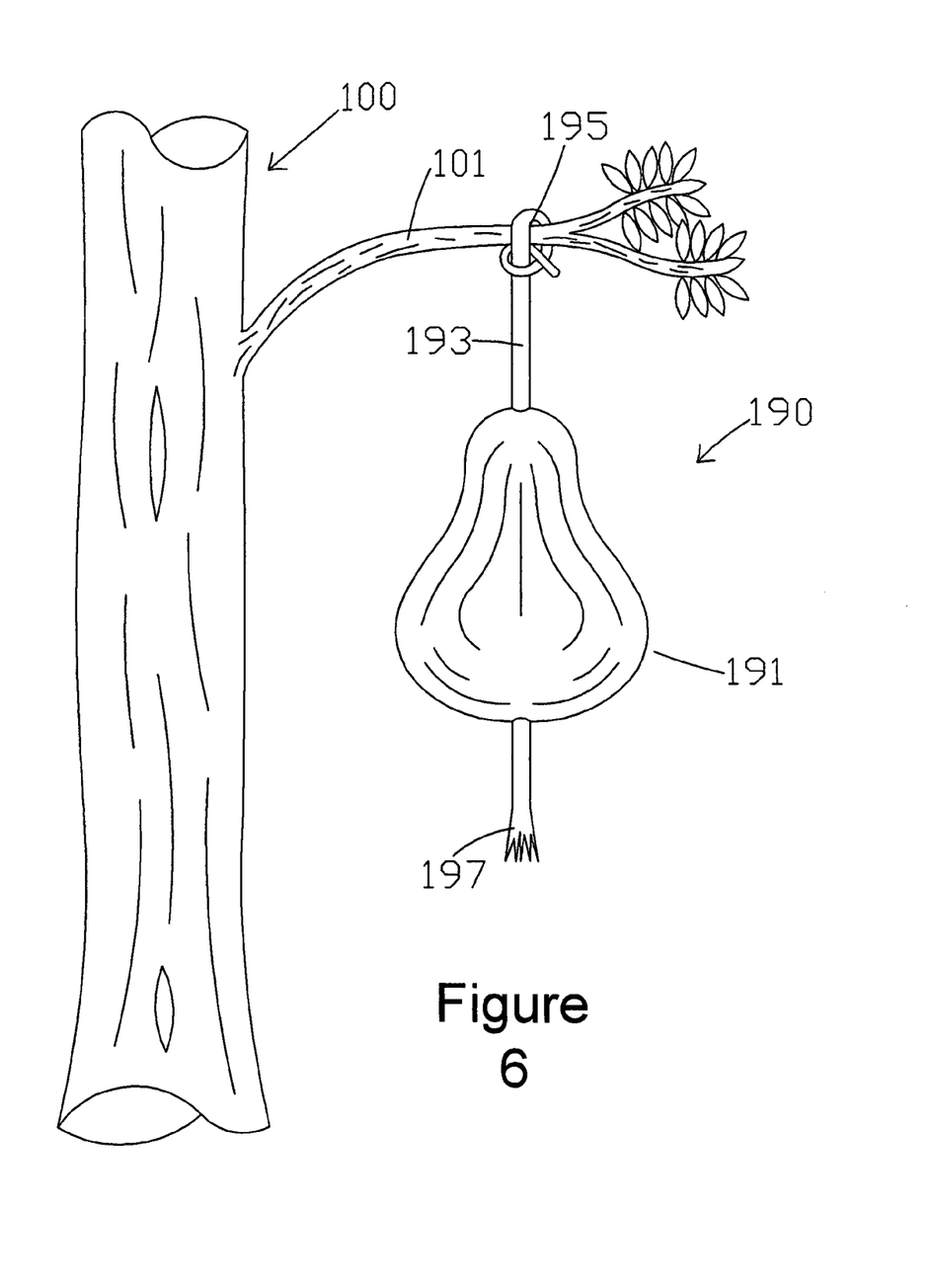
FIG. 6 a front view of another embodiment of a present invention slow release deer and rodent outdoor deterrent device that is a pearoid and is tied to and hung from a branch of a sapling; and, FIG. 7 is a diagrammatic presentation of some of the key parameters and choices for the present invention slow release deer and rodent outdoor deterrent device.

FIG. 6 a front view of another embodiment of a present invention slow release deer and rodent outdoor deterrent device 191 that is a pearoid and is tied to and hung from branch 101 of sapling 100 from the previous Figure. Here, wick 193 extends out of pear shaped housing 191 at the top and is tied by knot 195 to hang from branch 101. Dispersing wick end 197 extends out from and is located below the housing 191. The device 190 works in the same fashion as previously discussed embodiments, and contains at least one dried repellent-containing teabag inside the housing 191 and in contact with the wick 193.

Figure 7:
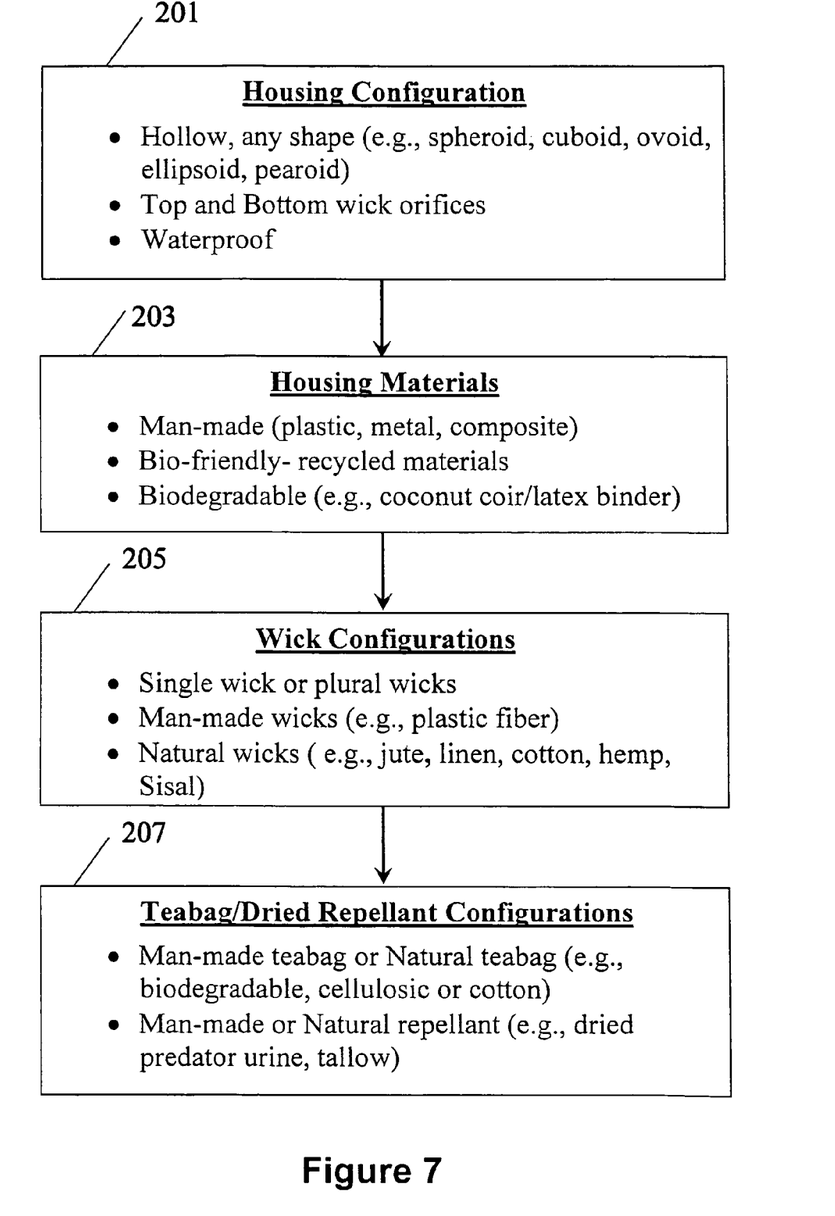

FIG. 7 is a diagrammatic presentation of some of the key parameters and choices for the present invention slow release deer and rodent outdoor deterrent device. Frame 201 outlines the essential aspects of the housing and frame 203 describes the housing materials options. Frame 205 sets forth wick options and frame 207 sets forth the repellent and teabags possibilities.

Although particular embodiments of the invention have been described in detail herein With reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A slow release deer and rodent outdoor deterrent device, which comprises:
    a) a waterproof hollow housing having a top and a bottom, and having a top wick orifice at said top and a bottom wick orifice at said bottom;
    b) a wick externally extending from outside said hollow housing top, through said top wick orifice and into said hollow housing, down through said hollow housing, through said bottom wick orifice and externally below said hollow housing bottom, said wick having an external top wetting portion to deliver water into said housing, and having an external brew and brew odor dispensing bottom portion;
    c) a teabag containing dried repellant that is activated by water contact, said teabag acting as a two way filter to permit water to enter said teabag and to permit a water-dissolved repellant brew with a brew odor to exit said teabag, said teabag being inside said hollow housing in physical contact with said wick;
    wherein, when said device is hung outdoors proximate vegetation or other item to be protected and said device is hung with said hollow housing top facing upwardly and said wick extending upwardly from said top orifice, and when water is applied to said wick by man or nature, water travels down said wick and enters said hollow housing on said wick, contacts said teabag, contacts said dried repellant and forms a water-dissolved repellant brew; said brew flows down said wick through said bottom wick orifice and dispenses repellant brew odor from said wick that extends below said bottom of said hollow housing.

2. The slow release deer and rodent outdoor deterrent device of claim 1 wherein said dried repellant is selected from the group consisting of natural predator-sourced repellant and man-made repellant.

3. The slow release deer and rodent outdoor deterrent device of claim 1 wherein said dried repellant is a dried predator urine.

4. The slow release deer and rodent outdoor deterrent device of claim 1 wherein said wick is selected from the group consisting of natural fiber wicks and man-made wicks.

5. The slow release deer and rodent outdoor deterrent device of claim 1 wherein said wick is selected from the group consisting of hemp, jute, cotton, linen and sisal.

6. The slow release deer and rodent outdoor deterrent device of claim 1 wherein said hollow housing has at least two parts that are joined together.

7. The slow release deer and rodent outdoor deterrent device of claim 1 wherein said hollow housing has a shape selected from the group consisting of spheroid, cuboid, ovoid, ellipsoid and fruit-shaped.

8. The slow release deer and rodent outdoor deterrent device of claim 1 wherein all components thereof are biodegradable.

9. The slow release deer and rodent outdoor deterrent device of claim 8 wherein said hollow housing is coconut coir and natural waterproof binder.

10. The slow release deer and rodent outdoor deterrent device of claim 9 wherein said natural waterproof binder is latex.

\* \* \* \* \*